US011809305B2

(12) United States Patent
Belihomji et al.

(10) Patent No.: US 11,809,305 B2
(45) Date of Patent: Nov. 7, 2023

(54) SYSTEMS AND METHODS FOR GENERATING MODIFIED APPLICATIONS FOR CONCURRENT TESTING

(71) Applicant: Verizon Patent and Licensing Inc., Arlington, VA (US)

(72) Inventors: Adil Belihomji, Monmouth Junction, NJ (US); Abhilash Paul, Irving, TX (US); Naga Dumpala, Edison, NJ (US); Shashidhar Hiremath, Skillman, NJ (US); Sunil Joshua Alexander Konaiyagarri, Somerset, NJ (US); Ning Gao, Jersey City, NJ (US); Nikhil Kommera, Chesterfield, NJ (US); Senthil Muthusamy, Frisco, TX (US); Ramasubramanian Radhakkrishnan, Ashok Nagar (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 762 days.

(21) Appl. No.: 16/832,838

(22) Filed: Mar. 27, 2020

(65) Prior Publication Data

US 2021/0303451 A1 Sep. 30, 2021

(51) Int. Cl.
*G06F 11/36* (2006.01)
*G06N 20/00* (2019.01)

(52) U.S. Cl.
CPC ...... *G06F 11/3688* (2013.01); *G06F 11/3684* (2013.01); *G06N 20/00* (2019.01)

(58) Field of Classification Search
CPC .. G06F 11/3684; G06F 11/3688; G06N 20/00
See application file for complete search history.

(56) References Cited

U.S. PATENT DOCUMENTS

| 9,053,435 | B2* | 6/2015 | Krukow | G06N 20/00 |
|---|---|---|---|---|
| 10,452,523 | B1* | 10/2019 | Vijayalekshmi | G06F 11/3688 |
| 10,949,337 | B1* | 3/2021 | Yalla | G06N 20/00 |
| 11,074,159 | B1* | 7/2021 | Yuan | G06F 11/3688 |
| 2011/0145653 | A1* | 6/2011 | Broadfoot | G06F 11/3604 |
| | | | | 714/E11.217 |
| 2015/0081598 | A1* | 3/2015 | Depizzol | G06F 8/35 |
| | | | | 706/12 |
| 2019/0213115 | A1* | 7/2019 | Takawale | G06F 11/3692 |
| 2020/0310948 | A1* | 10/2020 | Culibrk | G06F 17/18 |

(Continued)

*Primary Examiner* — S. Sough
*Assistant Examiner* — Zheng Wei

(57) ABSTRACT

A device may receive parameters to test modifications to an application associated with a product and/or a service, and may process data identifying the parameters and the application, with a machine learning model, to generate test applications for testing corresponding modifications to the application. The device may define test group sizes of test groups for testing the test applications, and may receive, from user devices, requests for accessing the application. The device may assign, based on the test group sizes, sets of the user devices to the test groups for testing the test applications, and may provide the test applications concurrently to the corresponding sets of the user devices based on the test groups. The device may receive, from the corresponding sets of the user devices, feedback associated with the test applications, and may perform one or more actions based on the feedback.

20 Claims, 14 Drawing Sheets

(56) References Cited

U.S. PATENT DOCUMENTS

2021/0056007 A1* 2/2021 Viswanathan ...... G06F 11/3688
2021/0081308 A1* 3/2021 Golubev ............. G06F 11/3688
2021/0240601 A1* 8/2021 Calvano ............. G06F 11/3692

* cited by examiner

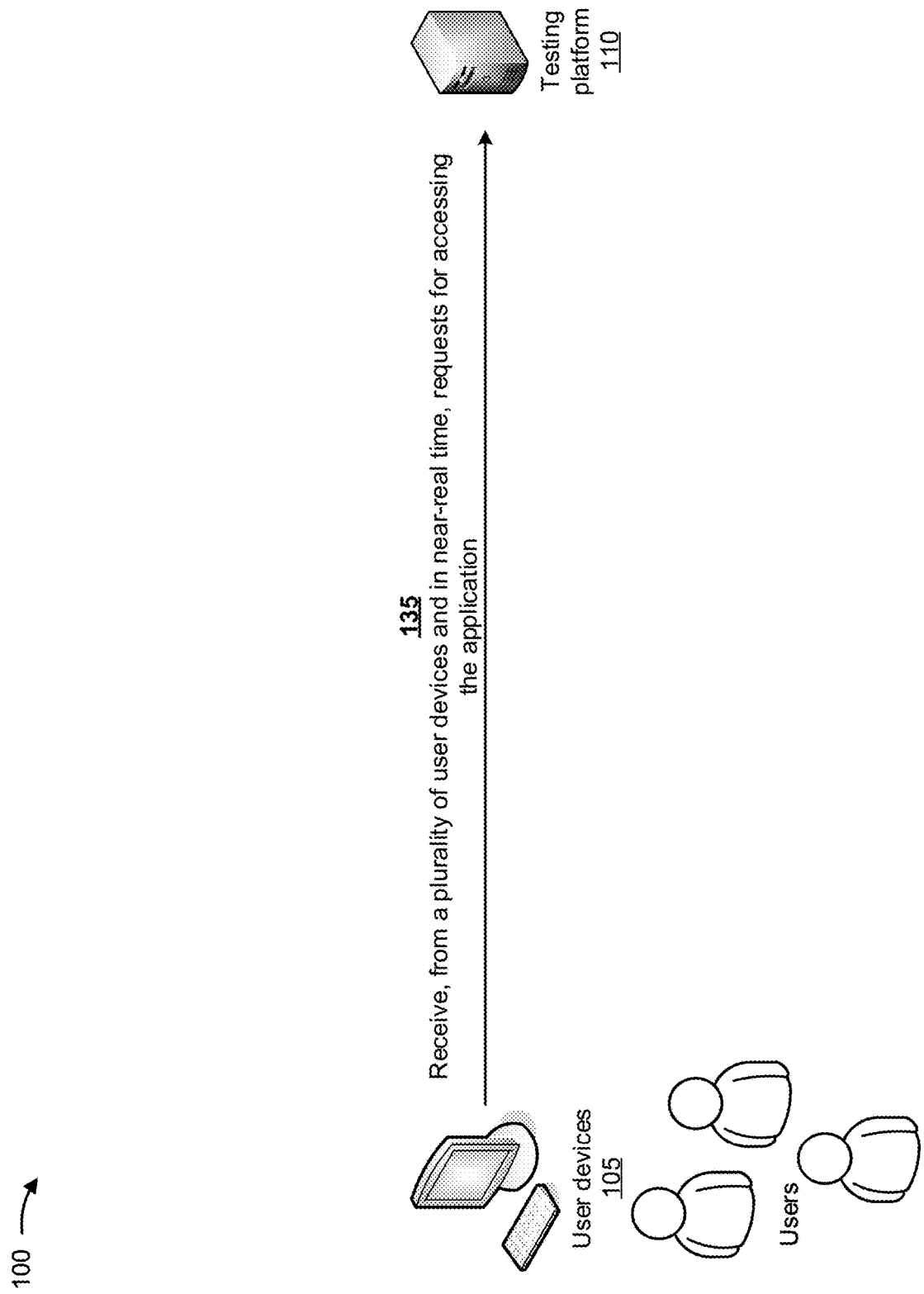

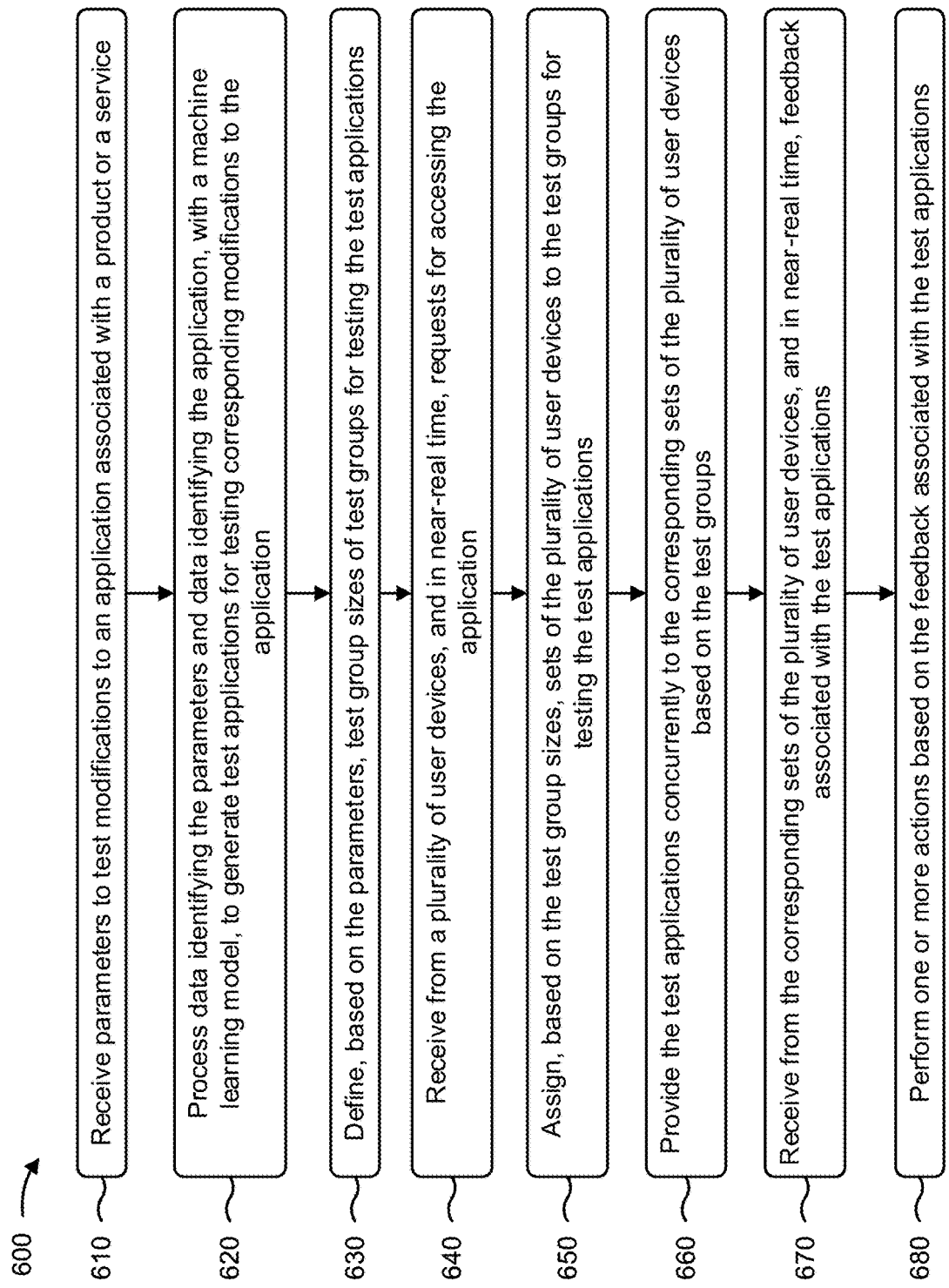

SYSTEMS AND METHODS FOR GENERATING MODIFIED APPLICATIONS FOR CONCURRENT TESTING

BACKGROUND

Many applications recommend products, services, movies, articles, and/or the like to customers. For example, web applications may be utilized by a customer to search for and/or purchase products and/or services. Finding an optimum product presentation for the customer may, however, require extensive testing and recoding of web applications.

BRIEF DESCRIPTION OF THE DRAWINGS

FIGS. 1A-1I are diagrams of one or more example implementations described herein.

FIG. 6 is a flow chart of an example process for utilizing machine learning to generate modified applications for concurrent testing.

DETAILED DESCRIPTION OF PREFERRED EMBODIMENTS

Figure 1A:
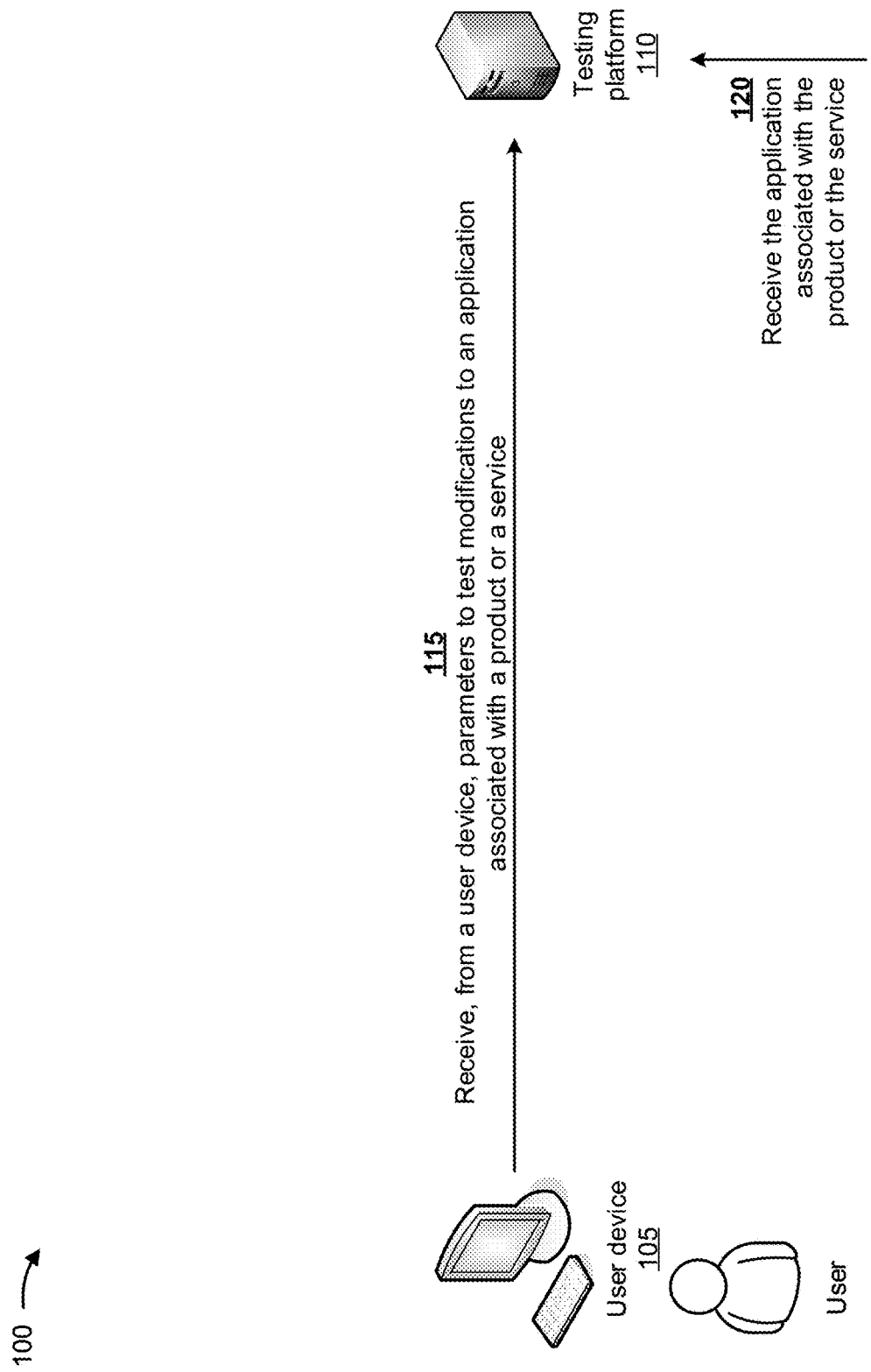

The following detailed description of example implementations refers to the accompanying drawings. The same reference numbers in different drawings may identify the same or similar elements.

When an application is provided for purchasing a product and/or a service, the application may include several steps that aid a customer in purchasing the product and/or the service. For example, if a customer wants to purchase a smart phone, an application may include steps associated with selecting the smart phone, purchasing a protection plan for the smart phone, purchasing a wireless phone plan for the smart phone, paying for the purchase, and/or the like. Such steps may enhance or diminish a customer experience. Thus, an owner of the application may wish to test different steps and/or combinations of steps to determine which steps and/or which combinations of steps enhance the customer experience. Unfortunately, such testing is cumbersome, is haphazard, and provides inaccurate results. Thus, current application testing techniques waste computing resources (e.g., processing resources, memory resources, communication resources, and/or the like), networking resources, and/or the like associated with performing disjointed testing of an application, implementing the incorrect results of testing an application, correcting the incorrect results if discovered, and/or the like. Further, because of the extremely large number of possible scenarios involved in simple comparison testing, improvements in the customer experience may be difficult to identify and slow to be implemented.

Some implementations described herein provide a testing platform that utilizes machine learning to generate modified applications for concurrent testing. For example, the testing platform may receive parameters to test modifications to an application associated with a product and/or a service, and may process data identifying the parameters and data identifying the application, with a machine learning model, to generate test applications for testing corresponding modifications to the application. The testing platform may define, based on the parameters, test group sizes of test groups for testing the test applications, and may receive, from a plurality of user devices and in near-real time, requests for accessing the application. The testing platform may assign, based on the test group sizes, sets of the plurality of user devices to the test groups for testing the test applications, and may provide the test applications concurrently to the corresponding sets of the plurality of user devices based on the test groups. The testing platform may receive from the corresponding sets of the plurality of user devices, and in near-real time, feedback associated with the test applications, and may perform one or more actions based on the feedback associated with the test applications.

In this way, the testing platform may utilize machine learning to generate modified applications for concurrent testing. Unlike current application testing techniques, the testing platform enables concurrent testing of numerous different modifications to an application in near-real time, provides reusable code blocks that can be manipulated to modify the application, provides near-real time feedback associated with the different modifications to the application, and/or the like. Thus, the testing platform conserves computing resources, networking resources, and/or the like that would otherwise have been wasted in performing disjointed testing of an application, implementing the incorrect results of testing an application, correcting the incorrect results if discovered, and/or the like.

FIGS. 1A-1I are diagrams of one or more example implementations 100 described herein. As shown in FIG. 1A, a user device 105 may be associated with a user (e.g., an application developer associated with an entity providing an application) and a testing platform 110. User device 105 may include a mobile device, a computer, a set-top box, and/or the like that the user may utilize to interact with testing platform 110. Testing platform 110 may include a platform that utilizes machine learning to generate modified applications for concurrent testing, as described herein.

As further shown in FIG. 1A, and by reference number 115, testing platform 110 may receive, from user device 105, parameters to test modifications to an application associated with a product and/or a service. For example, the parameters may be associated with modifications to be made to the application (e.g., change a user interface, change an order of user interfaces, remove a user interface, provide different offers for products and/or services, and/or the like), may be associated with a manner in which the application is to be tested (e.g., test group sizes, test group characteristics, and/or the like), and/or the like.

As further shown in FIG. 1A, and by reference number 120, testing platform 110 may receive the application associated with the product or the service. The application may be, for example, an application for purchasing a product and/or a service, for obtaining customer service associated with the product or the service, for obtaining information about the product or the service, and/or the like. For example, the application may be a web application. The testing platform 110 may receive the application from a data structure (e.g., a database, a table, a list, and/or the like) associated with testing platform 110, from a server device, from user device 105, and/or the like.

Figure 1B:
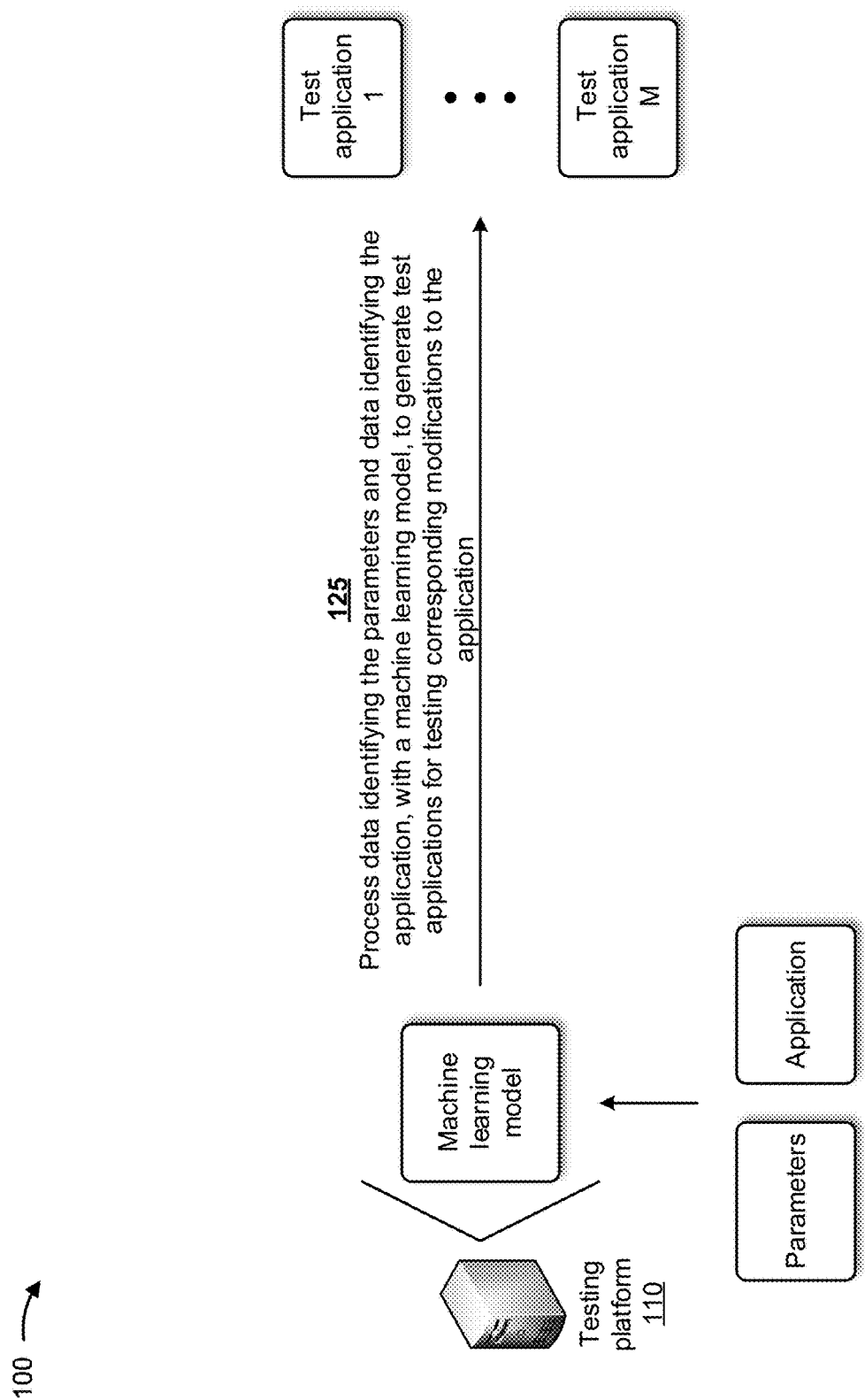

As shown in FIG. 1B, and by reference number 125, testing platform 110 may process data identifying the parameters and data identifying the application, with a machine learning model, to generate test applications for testing corresponding modifications to the application. For example, the test applications may include a test application that modifies a user interface feature of the application, a test application that modifies an order of user interfaces associated with the application, a test application that modifies a user interface of the application, a test application that removes one or more user interfaces associated with the application, a test application that modifies an offer for the product or the service associated with the application, and/or the like. One or more of the test applications may be associated with a same modification of the modifications to the application. Alternatively, each of the test applications may be associated with a different modification of the modifications to the application.

One or more of the test applications may be associated with different kinds of tests. For example, one or more of the test applications may be associated with changing an order of web pages presented for display, modifying a user interface of the application (e.g., changing a user interface button), testing a different offer or sales model (e.g., a price reduction), and/or the like. In some implementations, the test applications provide testing for different flows associated with the application. For example, an application may perform two process steps sequentially (e.g., obtaining contact information and then performing a credit check) and the test application may modify the application to perform the two process steps concurrently (e.g., obtaining the contact information and performing the credit check at the same time).

The machine learning model may include a clustering model, a random forest model, a decision tree model, k-means model, a density-based spatial clustering of applications with noise (DBSCAN) model, a clustering using a Gaussian mixture model (GMM), and/or the like. In some implementations, testing platform 110 stores a plurality of code blocks associated with the application and, when processing the data identifying the parameters and the data identifying the application with the machine learning model, testing platform 110 may process the plurality of code blocks to manipulate the plurality of code blocks for generation of the test applications for testing the corresponding modifications to the application. In this way, testing platform 110 may provide reusable code blocks of pages and features (e.g., steps of a method) that can be manipulated to modify the application (e.g., each step may have sub-steps that may also be reordered).

In some implementations, the machine learning model automatically generates different flows for the application, and determines which flows are successful and which flows are unsuccessful. Thus, the machine learning model may fine tune improvements to the application, in near-real time, without having to do standard comparison type testing. The machine learning model may combine different flows together without having to integrate code since the application may be modular and easily reconfigurable without having to write any additional call flows or test cases. Since the call flows are broken down into modular pieces, the machine learning model may quickly rebuild call flows to test the performance of particular flows.

In some implementations, testing platform 110 may train the machine learning model with historical data (e.g., historical parameters to test modifications to applications, historical application data, and/or the like) to enable the machine learning model to generate test applications for testing modifications to applications. For example, testing platform 110 may train the machine learning model in a manner similar to the manner described below in connection with FIG. 2. In some implementations, rather than training the machine learning model, testing platform 110 may obtain the machine learning model from another system or device that trained the machine learning model. In this case, testing platform 110 may provide the other system or device with historical data for use in training the machine learning model, and may provide the other system or device with updated historical data to retrain the machine learning model in order to update the machine learning model. Testing platform 110 may apply the machine learning model to new observations (e.g., the data identifying the parameters and the application) in a manner similar to the manner described below in connection with FIG. 3.

Figure 1C:
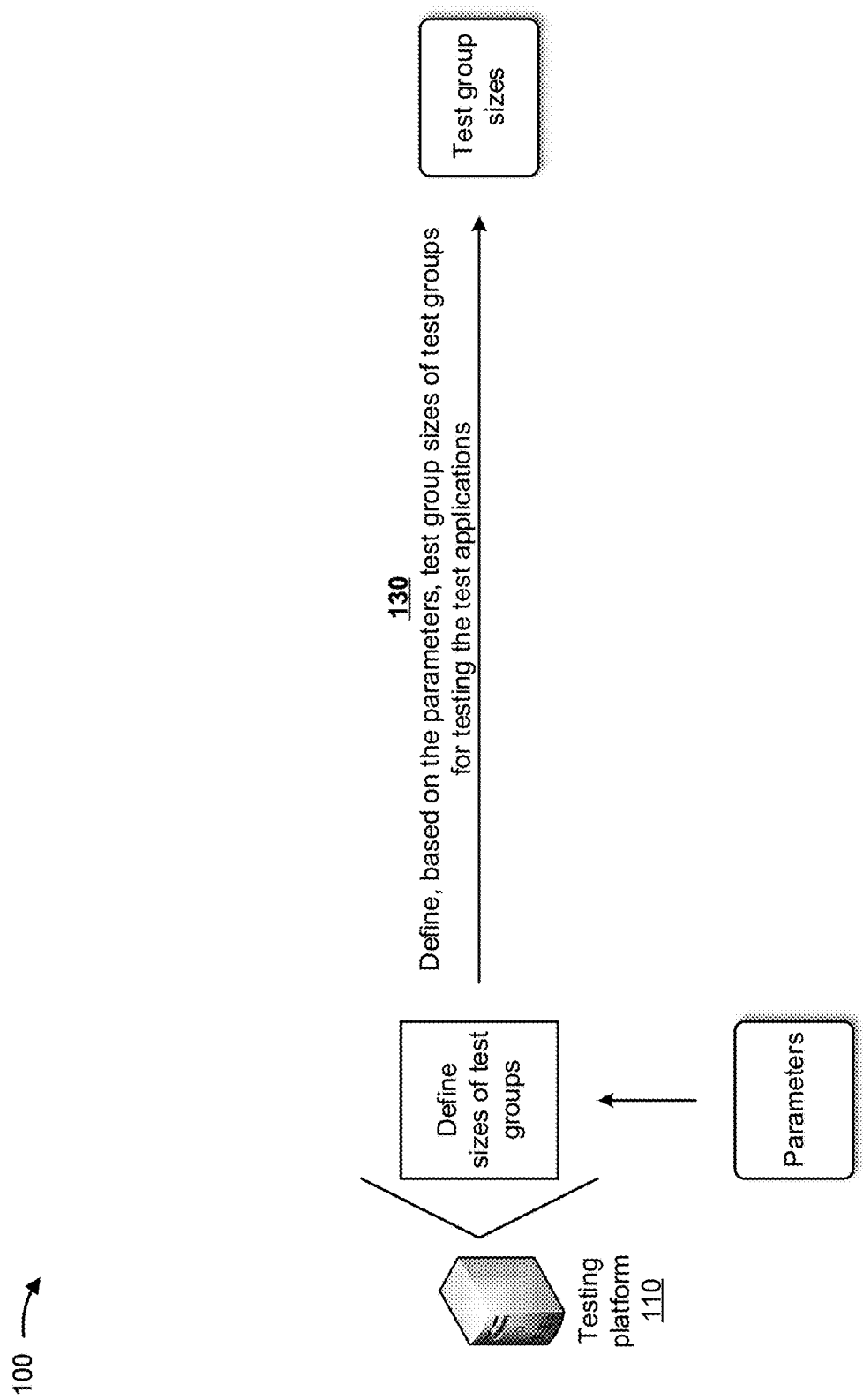

As shown in FIG. 1C, and by reference number 130, testing platform 110 may define, based on the parameters, test group sizes of test groups for testing the test applications. For example, testing platform 110 may define each test group size to be a particular percentage (e.g., five percent, ten percent, and/or the like) of user devices 105 to which testing will be applied. Test group sizes for one or more of the test applications may be the same, may be different, and/or the like. For example, a first test group size of five percent of user devices 105 may be defined for a first test application, a second test group size of ten percent of user devices 105 may be defined for a second test application, and/or the like.

Testing platform 110 may define the test group sizes based on different types of user devices 105 (e.g., smart glasses, smart phones, smart watches, laptops, tablets, computers, and/or the like) associated with the users, different hardware (e.g., different types of processors, different amounts of memory, and/or the like) associated with user devices 105, different software (e.g., different operating systems) utilized by user devices 105, different geographic locations of user devices 105, and/or the like. In this way, testing platform 110 may not only test different versions of the application, but also may test how the different versions of the application operate with different types of user devices 105. For example, testing platform 110 may test all of the modifications to the application on the same type of user device 105, may test all of the modifications to the application on a different types of user devices 105, and/or the like. Testing platform 110 may define the test group sizes based on a quantity of modifications made to the application (e.g., more modifications may require larger test group sizes), a quantity of test applications to be tested (e.g., more test applications may require smaller test group sizes), a confidence level associated with test results (e.g., larger test group sizes may provide a greater confidence in test results), and/or the like.

As shown in FIG. 1D, and by reference number 135, testing platform 110 may receive, from a plurality of user devices 105 and in near-real time (e.g., associated with actual customers or potential customers of a product and/or a service), requests for accessing the application by users associated with the plurality of user devices 105. The users may be users of the application, testers of the application, and/or the like. In some implementations, testing platform 110 may receive the requests for accessing the application via request user interfaces displayed by the plurality of user devices 105 to the users. Testing platform 110 may periodically receive the requests for accessing the application, may continuously receive the requests for accessing the application, and/or the like. In some implementations, testing platform 110 may store the requests for accessing the application in a data structure (e.g., a database, a table, a list, and/or the like) associated with testing platform 110.

Figure 1E:
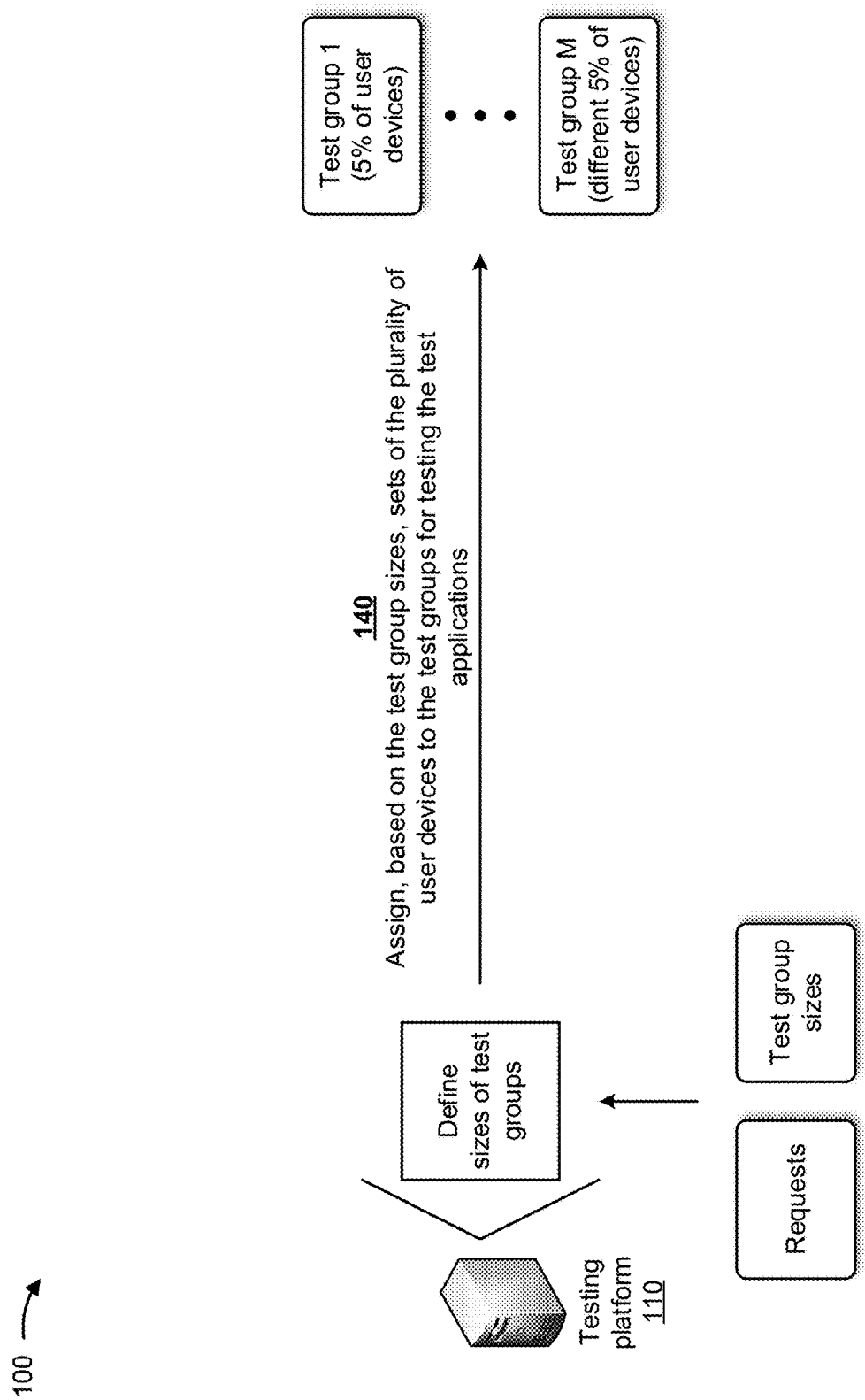

As shown in FIG. 1E, and by reference number 140, testing platform 110 may assign, based on the test group sizes, sets of the plurality of user devices 105 to the test groups for testing the test applications. For example, testing platform 110 may assign five percent of the plurality of user devices 105 (e.g., associated with the requests) to a particular test group that will receive a one of the test applications instead of the application (e.g., the five percent of user devices 105 may be assigned to a test application that provides a contact information request and performs a credit check concurrently, while the contact information request and the credit check may be performed sequentially for the remaining user devices 105). In some implementations, each set of the plurality of user devices 105 may be mutually exclusive of other sets of the plurality of user devices 105. For example, a first set of the plurality of user devices 105 may be provided first test application, a second set of the plurality of user devices 105 may be provided a second test application, and/or the like.

Figure 1F:
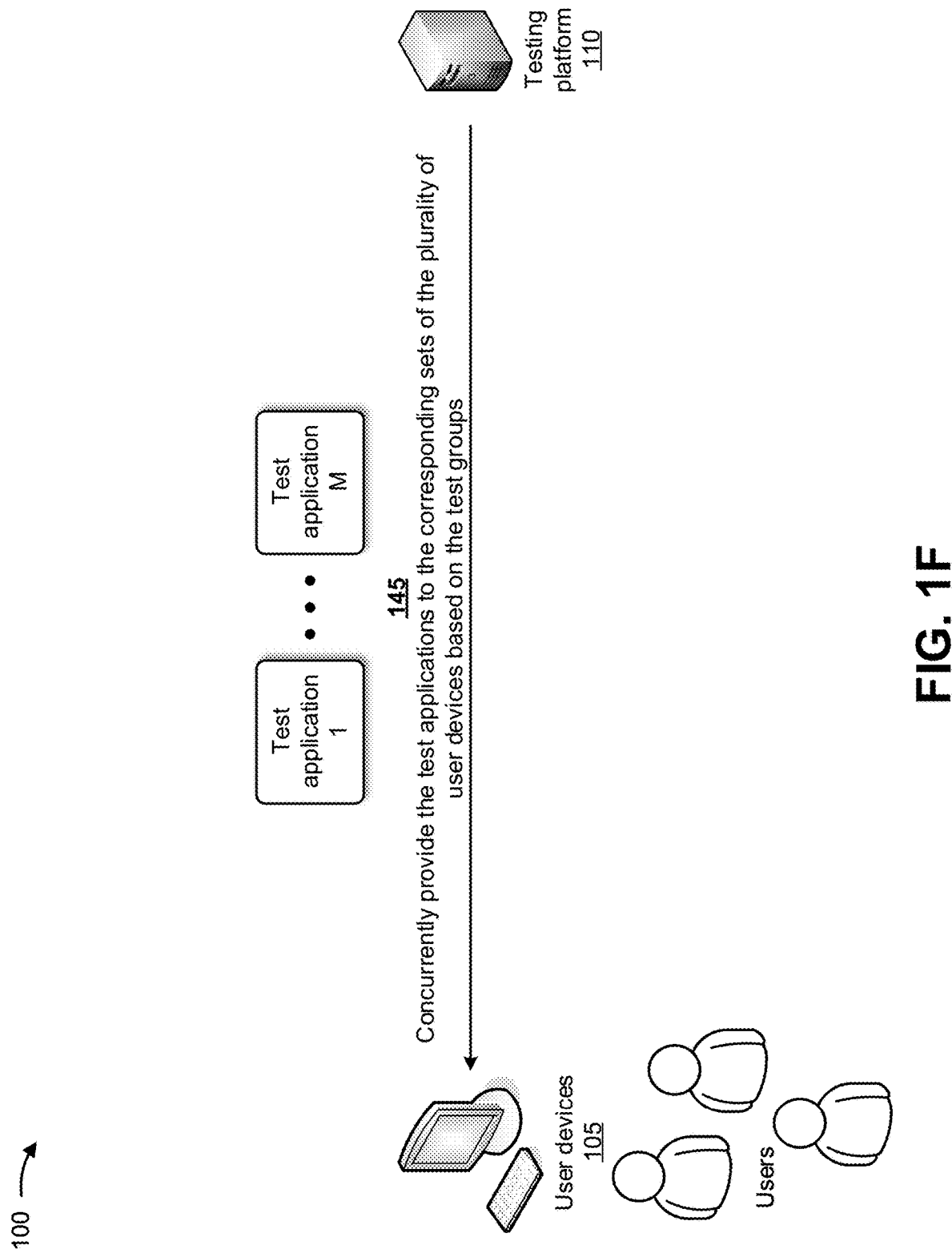

As shown in FIG. 1F, and by reference number 145, testing platform 110 may concurrently provide the test applications to the corresponding sets of the plurality of user devices 105 based on the test groups. In some implementations, testing platform 110 may enable one or more sandboxes to execute concurrent test applications for each set of the plurality of user devices 105 and to isolate one test application from another test application to measure an exact impact of each test application (e.g., by testing different combinations of the steps of the application). For example, testing platform 110 may take five percent of users of a first set of the plurality of user devices 105 through steps A, B, and C of the application, take another five percent of users of a second set of the plurality of user devices 105 though steps B, D, and E of the application, and/or the like. In some implementations, testing platform 110 may include a sandbox allocator that routes traffic (e.g., test applications for different user devices 105) to test the application based on rule configurations (e.g., that may remain the same throughout a test period).

Figure 1G:
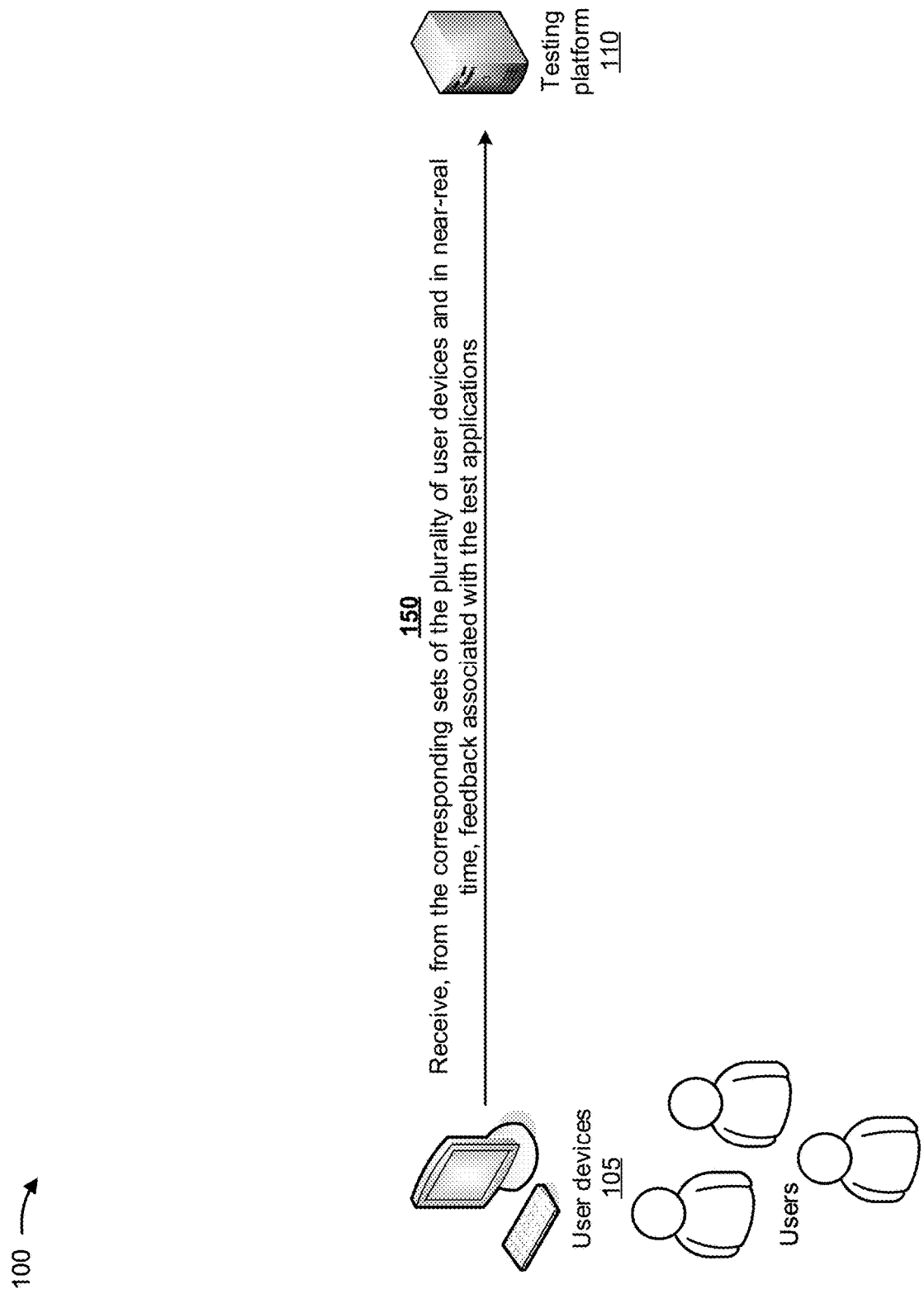

As shown in FIG. 1G, and by reference number 150, testing platform 110 may receive, from the corresponding sets of the plurality of user devices 105 and in near-real time, feedback associated with the test applications. For example, the feedback may indicate that a test application was successful, partially successful, a failure, and/or the like; may indicate what a user likes or dislikes about the test application; may indicate a score for the test application; and/or the like. In this way, testing platform 110 may provide real time integration that enables learning by providing live feedback to testing platform 110, and enables integration to test data models. In some implementations, testing platform 110 may include a real time feedback connector that is invoked via management of an application programming interface (API) configuration to provide a feedback message to testing platform 110 so that testing platform may interpret and/or process the feedback.

The feedback may include the users filling out feedback forms and providing, via user devices 105, the feedback forms to testing platform 110. The feedback may include user devices 105 monitoring user interaction with the test applications, capturing data related to the user interaction, and providing the data related to the user interaction to testing platform 110. The test applications may include software (e.g., embedding within the test applications) that monitors (e.g., with user permission) how the users interact with the test application and automatically provides information indicating the interactions that to testing platform 110. The software may automatically capture video and/or audio associated with the users (e.g., while the users interact with the test applications) and provide the video and/or audio to testing platform 110. The video and/or audio may provide indications of whether the users are happy, angry, frustrated, and/or the like with the test applications.

Figure 1H:
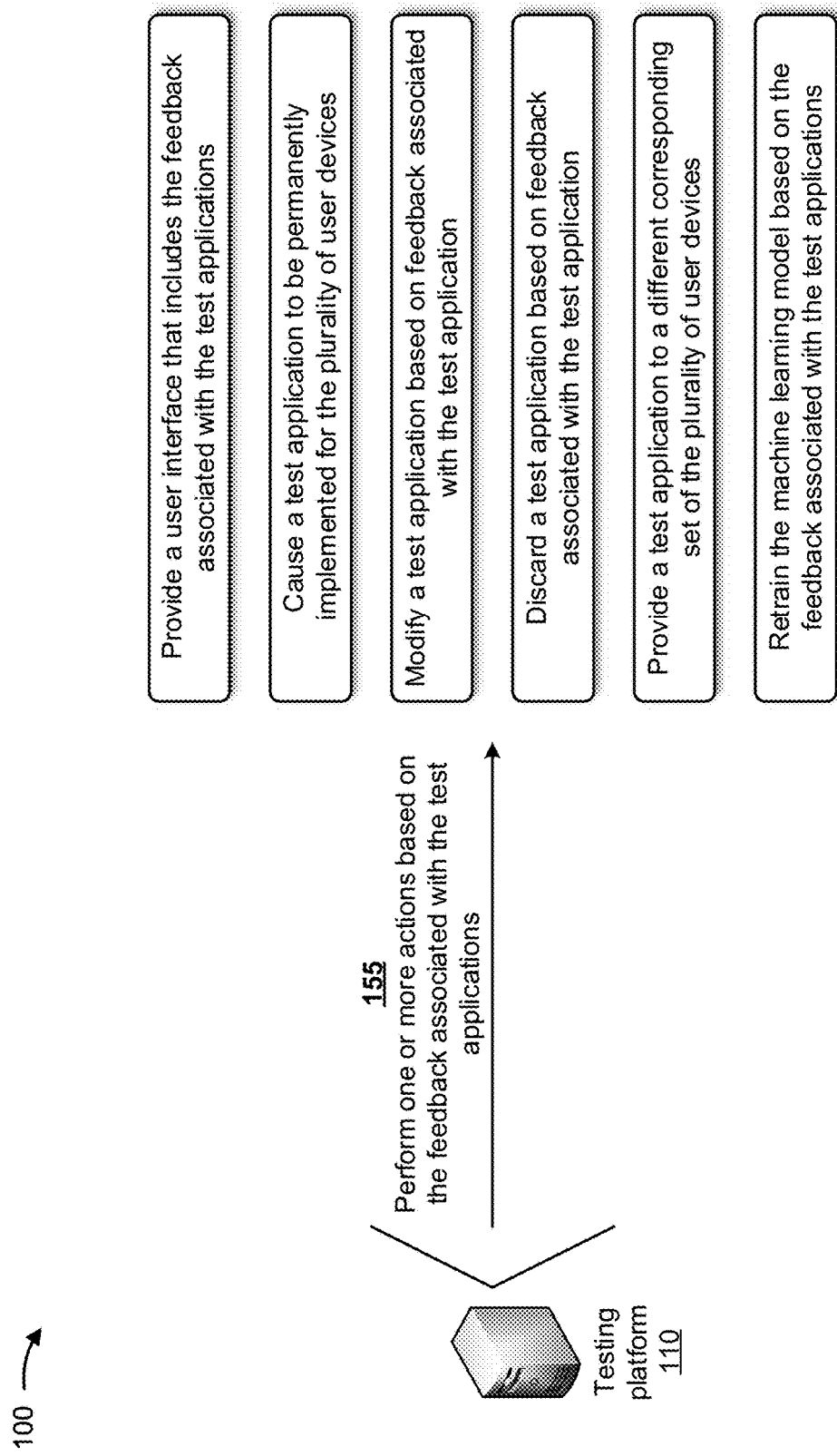

As shown in FIG. 1H, and by reference number 155, testing platform 110 may perform one or more actions based on the feedback associated with the test applications. In some implementations, the one or more actions may include testing platform 110 providing a user interface that includes the feedback associated with the test applications. For example, testing platform 110 may provide a graphical user interface that identifies the test applications, the modifications made to the application to generate the test applications, and the user feedback associated with the test applications. This may enable an application provider to determine whether the modifications to the application improved the application experience for the users of user devices 105. For example, the user interface may display a percentage of users who indicated that the user experience was improved, was not improved, and/or the like. As another example, the user interface may indicate an extent to which users indicated that the user experience was improved, was not improved, and/or the like. In this way, testing platform 110 may enable the application provider to select modifications to make to the application in an efficient and effective manner, thereby increasing the likelihood that a product and/or a service will be purchased and conserving resources that would otherwise have been wasted making modifications that would not improve user experience, failing to make modifications that would improve user experience, and/or the like.

In some implementations, the one or more actions may include testing platform 110 causing a test application to be permanently implemented for the plurality of user devices 105. For example, testing platform 110 may automatically determine, based on feedback associated with the test application, that the modification associated with the test application should be implemented (e.g., based on applying metrics, rules, thresholds, and/or the like to the feedback associated with the test application).

In some implementations, the one or more actions may include testing platform 110 modifying a test application based on feedback associated with the test application. For example, testing platform 110 may automatically modify the test application to change a user interface, a feature of a user interface, an order of user interfaces, a product and/or service offer, a sales model, and/or the like based on the feedback associated with the test application. Testing platform 110 may provide the modified test application to a set of the plurality of user devices 105 for use as a newly modified test application, for further testing as a new test application, and/or the like.

In some implementations, the one or more actions may include testing platform 110 discarding a test application based on feedback associated with the test application. For example, testing platform 110 may automatically eliminate the test application from consideration as a newly modified version of the application (e.g., based on applying metrics, rules, thresholds, and/or the like to the feedback associated with the test application), which may enable other test applications to be selected and/or may cause a determination that the application should not be modified. In this way, testing platform 110 may conserve resources (e.g., computing resources, networking resources, human resources, and/or the like) that would otherwise have been wasted arranging and waiting for a human operator to determine whether to implement the modification (e.g., permanently implement the test application) for the plurality of user devices 105, considering an inferior modification to the application, unnecessarily modifying the application, and/or the like.

In some implementations, the one or more actions may include testing platform 110 providing a test application to a different corresponding set of the plurality of user devices 105. For example, testing platform 110 may provide the test application to a different test group of users (e.g., associated with a different set of the plurality of user devices 105) to compare results of testing to an original test group of users, to improve accuracy of the results, to better determine an adequate test group size (e.g., a quantity of user devices 105 for which testing is performed), and/or the like. In this way, testing platform 110 may improve the efficiency and accuracy of testing the application, which may conserve computing resources, networking resources, and/or the like.

In some implementations, the one or more actions may include testing platform 110 retraining the machine learning model based on the feedback associated with the test applications. For example, testing platform 110 may retrain the machine learning model to generate test applications for testing corresponding modifications to the application. In this way, testing platform 110 may improve the accuracy of the machine learning model in generating the test applications, which may improve speed and efficiency of the machine learning model and conserve computing resources, networking resources, and/or the like.

Additionally, or alternatively, testing platform 110 may generate one or more new test applications based on the feedback associated with the test applications, and may provide the one or more new test applications to one or more new sets of the plurality of user devices 105. Additionally, or alternatively, testing platform 110 may propose one or more additional modifications to the application based on the feedback associated with the test applications, and may generate one or more new test applications based on the one or more additional modifications to the application. In this way, testing platform 110 may continually improve testing of the application, which may conserve computing resources, networking resources, and/or the like.

Figure 1I:
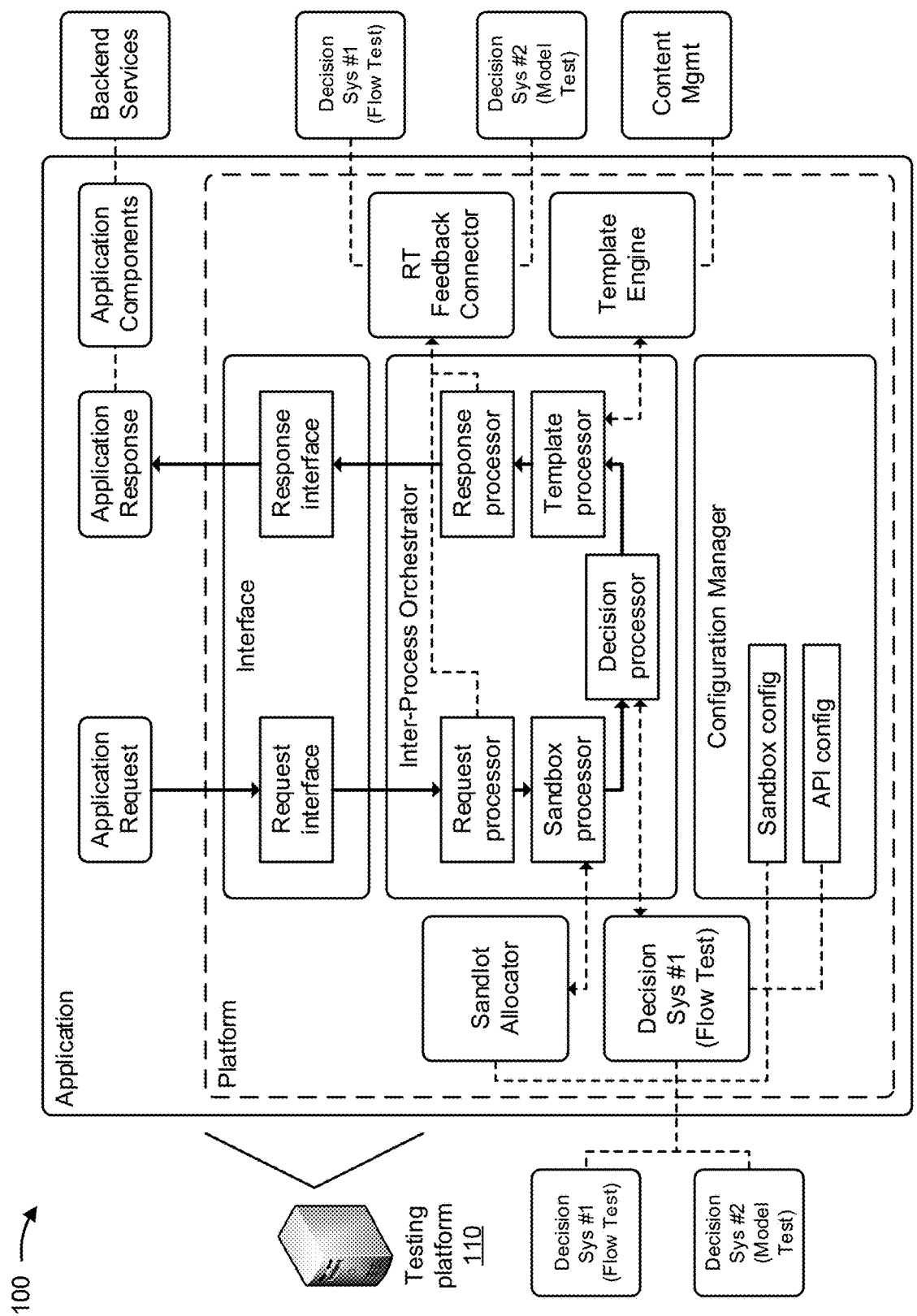

As shown in FIG. 1I, testing platform 110 may include an interface that includes a request interface and a response interface; an inter-process orchestrator that includes a request processor, a sandbox processor, a decision processor, a template processor, and a response processor; and a configuration manager that includes a sandbox configuration and an application programming interface (API) configuration. The request interface may receive an application request from a user device 105, may validate request parameters associated with the request, may invoke the inter-process orchestrator, may provide the application request to the request processor, and/or the like. The request processor may provide the application request to the sandbox processor, which may employ a sandbox allocator to route traffic based on a rule configuration.

The sandbox allocator may route the traffic (e.g., based on the sandbox configuration) to multiple test application trials in a page with a different set of rules or a same set of rules, while keeping users in different test application trials mutually exclusive. The sandbox allocator may provide the traffic allocation to the decision processor, which may employ a decision system integrator to read an API configuration from the configuration manager and invoke a corresponding API decision system endpoint to access a corresponding test application. The decision processor may cause the template processor to invoke a template engine that fetches a page layout from a template library by forming a composite key based on information from the template processor. The template processor may cause the response processor to provide the test application, via the response interface, to user device 105. A real time feedback connector may receive feedback from user device 105 which may identify a user experience associated with the test application. The real time feedback connector may provide the request, the response, and feedback to a decision system (e.g., a first decision system that performs a flow test, a second decision system that performs a model test, and/or the like). In this way, testing platform 110 may decide whether to implement the test application as a new version of the application.

In this way, several different stages of the process for generating modified applications for concurrent testing are automated with machine learning models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning to generate modified applications for concurrent testing in the manner described herein. Finally, the process for utilizing machine learning to generate modified applications for concurrent testing conserves computing resources, networking resources, and/or the like that would otherwise have been wasted in performing disjointed testing of an application, implementing the incorrect results of testing an application, correcting the incorrect results if discovered, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
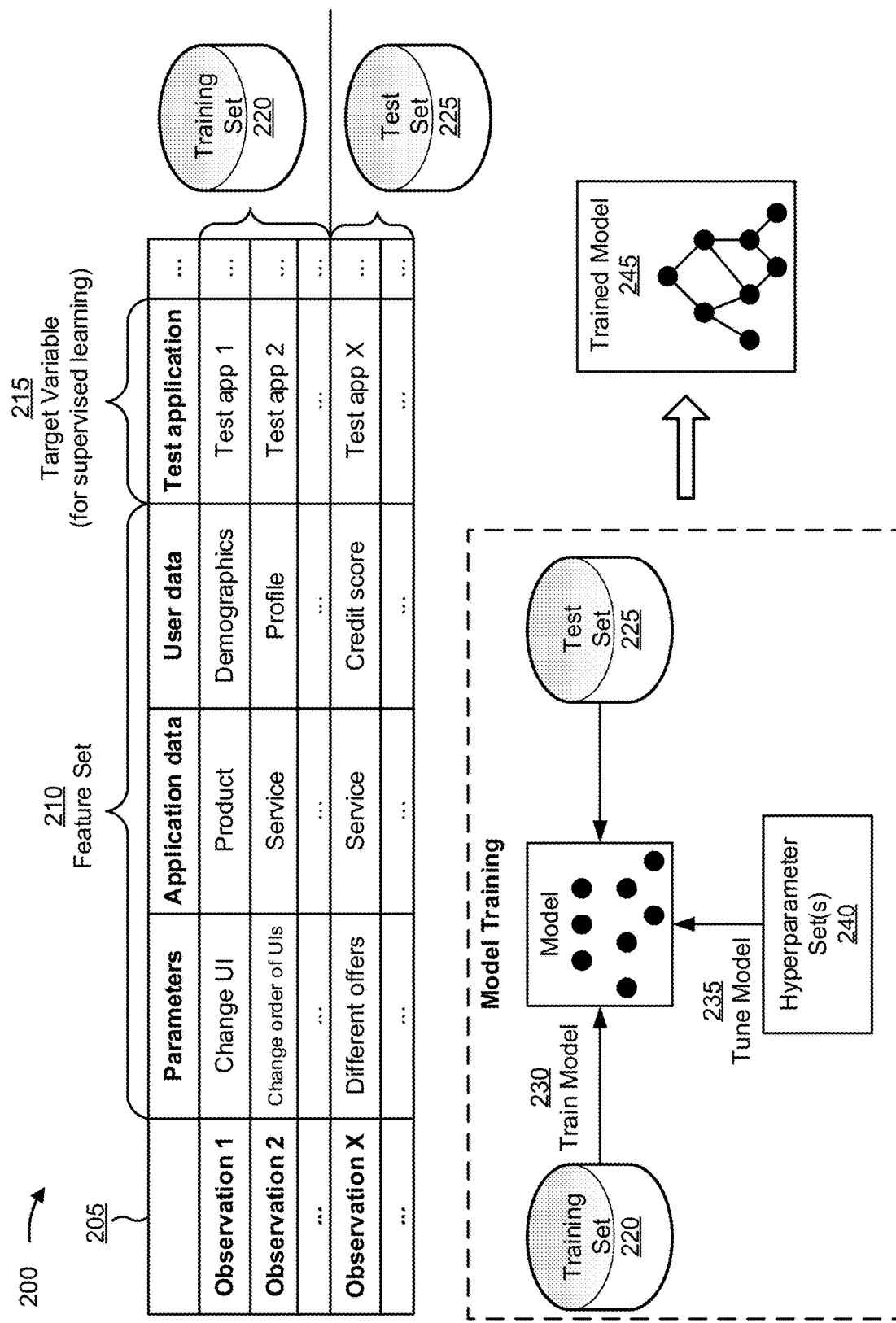
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as user device 105 and/or testing platform 110.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to user device 105, as described elsewhere herein. In some implementations, the machine learning system may receive the set of observations (e.g., as input) from user device 105.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from user device 105. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from user device 105, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of parameters for modifications to applications, a second feature of application data, a third feature of user data, and so on. As shown, for a first observation, the first feature may have a value of "change a user interface (UI)," the second feature may have a value of "product," the third feature may have a value of "demographics," and so on. These features and feature values are provided as examples, and may differ in other examples. For example, the feature set may include one or more of the following features: parameters for modifications of applications (e.g., change a UI, change an order of UIs, remove a UI, provide different offers for products and/or service, and/or the like), application data (e.g., an application associated with a product, a service, and/or the like), user data (e.g., demographics, gender, age, race, user profile, credit score, and/or the like), and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set

220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
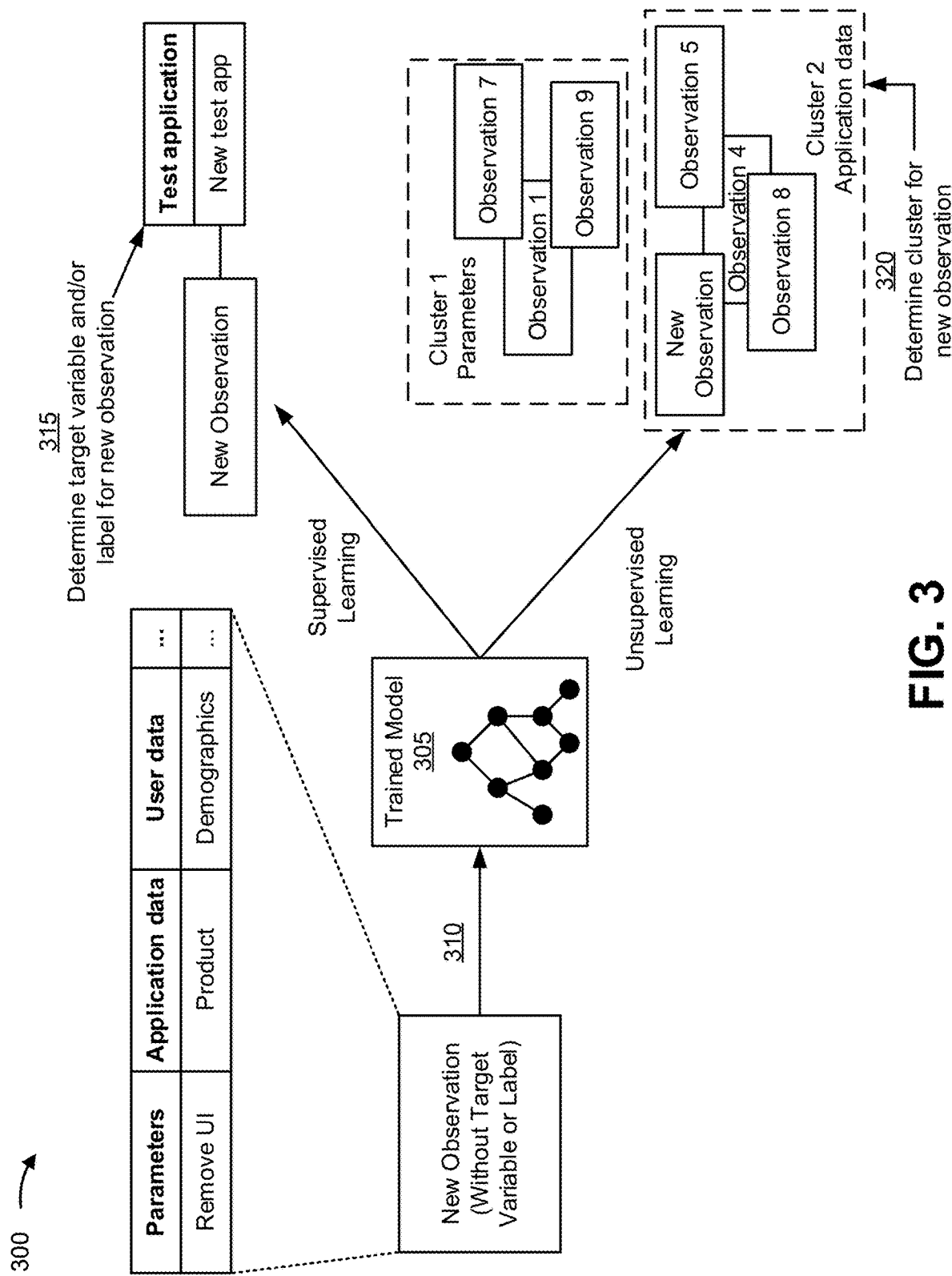
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as testing platform 110.

As shown by reference number 310, the machine learning system may receive a new observation (or a set of new observations), and may input the new observation to the machine learning model 305. As shown, the new observation may include a first feature of "parameters," a second feature of "application data," a third feature of "user data," and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 305 may predict a value of a set of content for the target variable of a response for the new observation, as shown by reference number 315. Based on this prediction (e.g., based on the value having a particular label/classification, based on the value satisfying or failing to satisfy a threshold, and/or the like), the machine learning system may provide a recommendation, such as a new test application for testing. Additionally, or alternatively, the machine learning system may perform an automated action and/or may cause an automated action to be performed (e.g., by instructing another device to perform the automated action), such as provide the new test application to user devices 105, and receive feedback associated with the new test application. As another example, if the machine learning system were to predict a value of another new test application for the target variable of the test application, then the machine learning system may provide a different recommendation (e.g., the other new test application) and/or may perform or cause performance of a different automated action (e.g., provide the other new test application to user devices 105). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g. cluster) the new observation in a parameters cluster, as shown by reference number 320. The observations within a cluster may have a threshold degree of similarity. Based on classifying the new observation in the parameters cluster, the machine learning system may provide a recommendation, such as the new test application. Additionally, or alternatively, the machine learning system may perform an automated action and/or may cause an automated action to be performed (e.g., by instructing another device to perform the automated action), such as provide the new test application to user devices 105. As another example, if the machine learning system were to classify the new observation in an application data cluster, then the machine learning system may provide a different recommendation (e.g., a different new test application) and/ or may perform or cause performance of a different automated action (e.g., provide the different new test application to user devices 105).

In this way, the machine learning system may apply a rigorous and automated process to generate modified applications for concurrent testing. The machine learning system enables recognition and/or identification of tens, hundreds, thousands, or millions of features and/or feature values for tens, hundreds, thousands, or millions of observations, thereby increasing an accuracy and consistency of modified applications for concurrent testing relative to requiring computing resources to be allocated for tens, hundreds, or thousands of operators to manually determine modified applications for concurrent testing using the features or feature values.

As indicated above, FIG. 3 is provided as an example. Other examples may differ from what is described in connection with FIG. 3.

Figure 4:
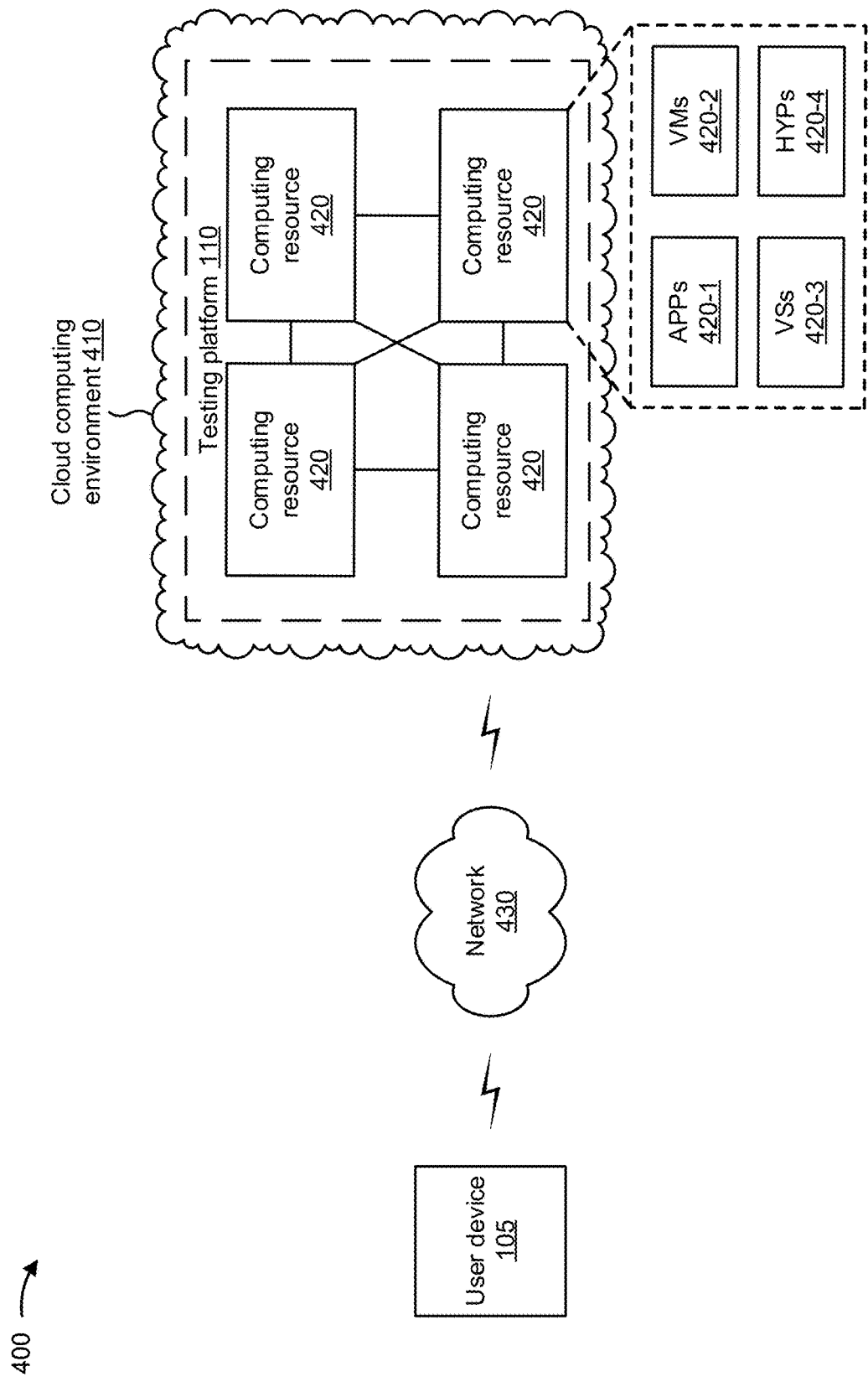
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include user device 105, a testing platform 110, and a network 430. Devices of environment 400 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a set-top box, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to testing platform 110.

Testing platform 110 includes one or more devices that utilize machine learning to generate modified applications for concurrent testing. In some implementations, testing platform 110 may be designed to be modular such that certain software components may be swapped in or out depending on a particular need. As such, testing platform 110 may be easily and/or quickly reconfigured for different uses. In some implementations, testing platform 110 may receive information from and/or transmit information to one or more user devices 105.

In some implementations, as shown, testing platform 110 may be hosted in a cloud computing environment 410. Notably, while implementations described herein describe testing platform 110 as being hosted in cloud computing environment 410, in some implementations, testing platform 110 may not be cloud-based (i.e., may be implemented outside of a cloud computing environment) or may be partially cloud-based.

Cloud computing environment 410 includes an environment that hosts testing platform 110. Cloud computing environment 410 may provide computation, software, data access, storage, etc., services that do not require end-user knowledge of a physical location and configuration of system(s) and/or device(s) that hosts testing platform 110. As shown, cloud computing environment 410 may include a group of computing resources 420 (referred to collectively as "computing resources 420" and individually as "computing resource 420").

Computing resource 420 includes one or more personal computers, workstation computers, mainframe devices, or other types of computation and/or communication devices. In some implementations, computing resource 420 may host testing platform 110. The cloud resources may include compute instances executing in computing resource 420, storage devices provided in computing resource 420, data transfer devices provided by computing resource 420, and/or the like. In some implementations, computing resource 420 may communicate with other computing resources 420 via wired connections, wireless connections, or a combination of wired and wireless connections.

As further shown in FIG. 4, computing resource 420 includes a group of cloud resources, such as one or more applications ("APPs") 420-1, one or more virtual machines ("VMs") 420-2, virtualized storage ("VSs") 420-3, one or more hypervisors ("HYPs") 420-4, and/or the like.

Application 420-1 includes one or more software applications that may be provided to or accessed by user device 105. Application 420-1 may eliminate a need to install and execute the software applications on user device 105. For example, application 420-1 may include software associated with testing platform 110 and/or any other software capable of being provided via cloud computing environment 410. In some implementations, one application 420-1 may send/receive information to/from one or more other applications 420-1, via a virtual machine 420-2.

Virtual machine 420-2 includes a software implementation of a machine (e.g., a computer) that executes programs like a physical machine. Virtual machine 420-2 may be either a system virtual machine or a process virtual machine, depending upon use and degree of correspondence to any real machine by virtual machine 420-2. A system virtual machine may provide a complete system platform that supports execution of a complete operating system ("OS"). A process virtual machine may execute a single program and may support a single process. In some implementations, virtual machine 420-2 may execute on behalf of a user (e.g., a user of user device 105 or an operator of testing platform 110), and may manage infrastructure of cloud computing environment 410, such as data management, synchronization, or long-duration data transfers.

Virtualized storage 420-3 includes one or more storage systems and/or one or more devices that use virtualization techniques within the storage systems or devices of computing resource 420. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 420-4 may provide hardware virtualization techniques that allow multiple operating systems (e.g., "guest operating systems") to execute concurrently on a host computer, such as computing resource 420. Hypervisor 420-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
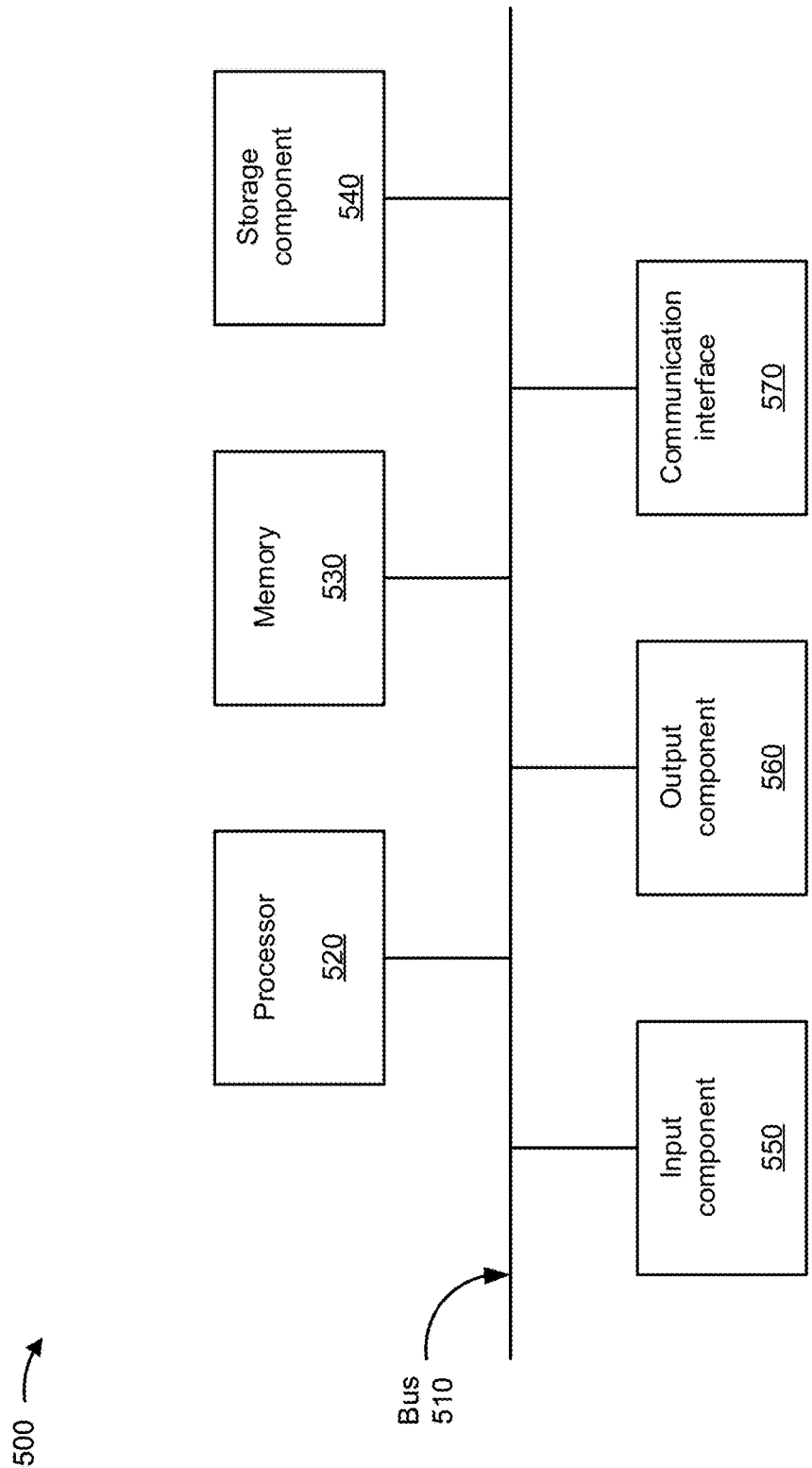
FIG. 5 is a diagram of example components of one or more devices of FIG. 2.

FIG. 5 is a diagram of example components of a device 500. Device 500 may correspond to user device 105, testing platform 110, and/or computing resource 420. In some implementations, user device 105, testing platform 110, and/or computing resource 420 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flow chart of an example process 600 for utilizing machine learning to generate modified applications for concurrent testing. In some implementations, one or more process blocks of FIG. 6 may be performed by a device (e.g., testing platform 110). In some implementations, one or more process blocks of FIG. 6 may be performed by another device or a group of devices separate from or including the device, such as a user device (e.g., user device 105).

As shown in FIG. 6, process 600 may include receiving parameters to test modifications to an application associated with a product and/or a service (block 610). For example, the device (e.g., using, computing resource 420, processor 520, communication interface 570, and/or the like) may receive parameters to test modifications to an application associated with a product and/or a service, as described above.

As further shown in FIG. 6, process 600 may include processing data identifying the parameters and data identifying the application, with a machine learning model, to generate test applications for testing corresponding modifications to the application (block 620). For example, the device (e.g., using, computing resource 420, processor 520, memory 530, and/or the like) may process data identifying the parameters and data identifying the application, with a machine learning model, to generate test applications for testing corresponding modifications to the application, as described above. In some implementations, one or more of the test applications may be associated with a same modification of the modifications to the application. In some implementations, each of the test applications may be associated with a different modification of the modifications to the application.

In some implementations, the test applications may include a test application that modifies a user interface feature of the application, a test application that modifies an order of user interfaces associated with the application, a test application that modifies a user interface of the application, or a test application that modifies an offer for the product or the service associated with the application. In some implementations, the test applications may provide testing for different flows associated with the application.

As further shown in FIG. 6, process 600 may include defining, based on the parameters, test group sizes of test groups for testing the test applications (block 630). For example, the device (e.g., using, computing resource 420, processor 520, storage component 540, and/or the like) may define, based on the parameters, test group sizes of test groups for testing the test applications, as described above.

As further shown in FIG. 6, process 600 may include receiving, from a plurality of user devices and in near-real time, requests for accessing the application (block 640). For example, the device (e.g., using, computing resource 420, processor 520, communication interface 570, and/or the like) may receive, from a plurality of user devices and in near-real time, requests for accessing the application, as described above.

As further shown in FIG. 6, process 600 may include assigning, based on the test group sizes, sets of the plurality of user devices to the test groups for testing the test applications (block 650). For example, the device (e.g., using, computing resource 420, processor 520, memory 530, and/or the like) may assign, based on the test group sizes, sets of the plurality of user devices to the test groups for testing the test applications, as described above. In some implementations, each set of the plurality of user devices may be mutually exclusive of other sets of the plurality of user devices.

As further shown in FIG. 6, process 600 may include providing the test applications concurrently to the corresponding sets of the plurality of user devices based on the test groups (block 660). For example, the device (e.g., using, computing resource 420, processor 520, memory 530, storage component 540, communication interface 570, and/or the like) may provide the test applications concurrently to the corresponding sets of the plurality of user devices based on the test groups, as described above.

As further shown in FIG. 6, process 600 may include receiving, from the corresponding sets of the plurality of user devices and in near-real time, feedback associated with the test applications (block 670). For example, the device (e.g., using, computing resource 420, processor 520, communication interface 570, and/or the like) may receive, from the corresponding sets of the plurality of user devices and in near-real time, feedback associated with the test applications, as described above.

As further shown in FIG. 6, process 600 may include performing one or more actions based on the feedback associated with the test applications (block 680). For example, the device (e.g., using, computing resource 420, processor 520, memory 530, storage component 540, communication interface 570, and/or the like) may perform one or more actions based on the feedback associated with the test applications, as described above. In some implementations, performing the one or more actions may include providing a user interface that includes the feedback associated with the test applications; causing one of the test applications to be permanently implemented for the plurality of user devices; or modifying one of the test applications based on feedback associated with the one of the test applications.

In some implementations, performing the one or more actions may include discarding one of the test applications based on feedback associated with the one of the test applications; providing one of the test applications to a different corresponding set of the plurality of user devices; or retraining the machine learning model based on the feedback associated with the test applications.

Process 600 may include additional implementations, such as any single implementation or any combination of implementations described below and/or in connection with one or more other processes described elsewhere herein.

In some implementations, process 600 may include storing a plurality of code blocks associated with the application, and processing the data identifying the parameters and the data identifying the application, with the machine learning model, to generate the test applications may include processing the plurality of code blocks, with the machine learning model, to manipulate the plurality of code blocks for generation of the test applications for testing the corresponding modifications to the application.

In some implementations, process 600 may include proposing one or more additional modifications to the application based on the feedback associated with the test applications; and generating one or more new test applications based on the one or more additional modifications to the application.

In some implementations, process 600 may include receiving the requests for accessing the application via request user interfaces.

In some implementations, process 600 may include modifying one of the test applications based on feedback associated with the one of the test applications; and providing the one of the test applications to the corresponding set of the plurality of user devices.

In some implementations, process 600 may include generating one or more new test applications based on the feedback associated with the test applications; and providing the one or more new test applications to one or more new sets of the plurality of user devices.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, parameters for modifications to an application associated with a product and/or a service, and to test the modifications;
processing, by the device, data identifying the parameters and data identifying the application, with a machine learning model, to generate test applications for testing corresponding modifications to be made to the application,
wherein each of the test applications includes one of the corresponding modifications;
defining, by the device and based on the parameters, test group sizes of test groups for testing the test applications;
receiving, by the device, from a plurality of user devices, and in near-real time, requests for accessing the application;
assigning, by the device and based on the test group sizes, sets of the plurality of user devices to the test groups for testing the test applications;
providing, by the device, the test applications concurrently to corresponding sets of the plurality of user devices based on the test groups;
receiving, by the device, from the corresponding sets of the plurality of user devices, and in near-real time, feedback associated with the test applications; and
performing, by the device, one or more actions based on the feedback associated with the test applications.

2. The method of claim 1, wherein performing the one or more actions comprises one or more of:
providing a user interface that includes the feedback associated with the test applications;
causing one of the test applications to be permanently implemented for the plurality of user devices; or
modifying one of the test applications based on feedback associated with the one of the test applications.

3. The method of claim 1, wherein performing the one or more actions comprises one or more of:
discarding one of the test applications based on feedback associated with the one of the test applications;
providing one of the test applications to a different corresponding set of the plurality of user devices; or
retraining the machine learning model based on the feedback associated with the test applications.

4. The method of claim 1, wherein one or more of the test applications are associated with a same modification of the modifications to the application.

5. The method of claim 1, wherein each of the test applications are associated with a different modification of the modifications to the application.

6. The method of claim 1, further comprising:
storing a plurality of code blocks associated with the application,
wherein processing the data identifying the parameters and the data identifying the application, with the machine learning model, to generate the test applications comprises:
processing the plurality of code blocks, with the machine learning model, to manipulate the plurality of code blocks for generation of the test applications for testing the corresponding modifications to the application.

7. The method of claim 1, wherein the test applications include one or more of:
a test application that modifies a user interface feature of the application,
a test application that modifies an order of user interfaces associated with the application,
a test application that modifies a user interface of the application, or
a test application that modifies an offer for the product or the service associated with the application.

8. A device, comprising:
one or more processors configured to:
receive parameters for modifications to an application associated with a product and/or a service, and to test the modifications;
process data identifying the parameters and data identifying the application, with a machine learning model, to generate test applications for testing corresponding modifications to be made to the application,
wherein each of the test applications includes one of the corresponding modifications, and
wherein the machine learning model has been trained based on:
historical parameter data identifying historical parameters to test modifications to historical applications, and
historical data identifying the historical applications;
define, based on the parameters, test group sizes of test groups for testing the test applications;
receive, from a plurality of user devices, requests for accessing the application;
assign, based on the test group sizes, sets of the plurality of user devices to the test groups for testing the test applications;
provide the test applications concurrently to corresponding sets of the plurality of user devices based on the test groups;
receive, from the corresponding sets of the plurality of user devices, feedback associated with the test applications; and
perform one or more actions based on the feedback associated with the test applications.

9. The device of claim 8, wherein the one or more processors, when performing the one or more actions, are configured to:
propose one or more additional modifications to the application based on the feedback associated with the test applications; and
generate one or more new test applications based on the one or more additional modifications to the application.

10. The device of claim 8, wherein the one or more processors, when receiving the requests for accessing the application, are configured to:
receive the requests for accessing the application via request user interfaces.

11. The device of claim 8, wherein each set of the plurality of user devices is mutually exclusive of other sets of the plurality of user devices.

12. The device of claim 8, wherein the one or more processors, when performing the one or more actions, are configured to:
modify one of the test applications based on feedback associated with the one of the test applications; and
provide the one of the test applications to the corresponding set of the plurality of user devices.

13. The device of claim 8, wherein the test applications provide testing for different flows associated with the application.

14. The device of claim 8, wherein the one or more processors, when performing the one or more actions, are configured to:
generate one or more new test applications based on the feedback associated with the test applications; and
provide the one or more new test applications to one or more new sets of the plurality of user devices.

15. A non-transitory computer-readable medium storing instructions, the instructions comprising:
one or more instructions that, when executed by one or more processors, cause the one or more processors to:
process data identifying parameters and data identifying an application, with a machine learning model, to generate test applications for testing corresponding modifications to be made to the application,
wherein each of the test applications includes one of the corresponding modifications,
wherein the parameters include parameters for modifications to the application, and to test the modifications, and
wherein the application is associated with a product and/or a service;
define, based on the parameters, test group sizes of test groups for testing the test applications;
receive, from a plurality of user devices, requests for accessing the application;
assign, based on the test group sizes, sets of the plurality of user devices to the test groups for testing the test applications;
provide the test applications concurrently to corresponding sets of the plurality of user devices based on the test groups;
receive, from the corresponding sets of the plurality of user devices, feedback associated with the test applications; and
perform one or more actions based on the feedback associated with the test applications.

16. The non-transitory computer-readable medium of claim 15, wherein the one or more instructions, that cause the one or more processors to perform the one or more actions, cause the one or more processors to one or more of:
provide a user interface that includes the feedback associated with the test applications;
cause one of the test applications to be permanently implemented for the plurality of user devices;
modify one of the test applications based on feedback associated with the one of the test applications;
discard one of the test applications based on feedback associated with the one of the test applications;
provide one of the test applications to a different corresponding set of the plurality of user devices; or
retrain the machine learning model based on the feedback associated with the test applications.

17. The non-transitory computer-readable medium of claim 15, wherein the one or more instructions, when executed by the one or more processors, further cause the one or more processors to:
store a plurality of code blocks associated with the application,
wherein the one or more instructions, that cause the one or more processors to process the data identifying the parameters and the data identifying the application, with the machine learning model, to generate the test applications, cause the one or more processors to:
process the plurality of code blocks, with the machine learning model, to manipulate the plurality of code blocks for generation of the test applications for testing the corresponding modifications to the application.

18. The non-transitory computer-readable medium of claim 15, wherein the one or more instructions, that cause the one or more processors to perform the one or more actions, cause the one or more processors to:
propose one or more additional modifications to the application based on the feedback associated with the test applications; and
generate one or more new test applications based on the one or more additional modifications to the application.

19. The non-transitory computer-readable medium of claim 15, wherein the one or more instructions, that cause the one or more processors to perform the one or more actions, cause the one or more processors to:
modify one of the test applications based on feedback associated with the one of the test applications; and
provide the one of the test applications to the corresponding set of the plurality of user devices.

20. The non-transitory computer-readable medium of claim 15, wherein the one or more instructions, that cause the one or more processors to perform the one or more actions, cause the one or more processors to:
generate one or more new test applications based on the feedback associated with the test applications; and
provide the one or more new test applications to one or more new sets of the plurality of user devices.

* * * * *